United States Patent
Haralson

(10) Patent No.: US 9,433,955 B2
(45) Date of Patent: Sep. 6, 2016

(54) SEAL MEMBER FOR PLURAL COMPONENT SPRAY GUN

(71) Applicant: Darron Haralson, Franklin, TN (US)

(72) Inventor: Darron Haralson, Franklin, TN (US)

( * ) Notice: Subject to any disclaimer, the term of this patent is extended or adjusted under 35 U.S.C. 154(b) by 172 days.

(21) Appl. No.: 14/054,305

(22) Filed: Oct. 15, 2013

(65) Prior Publication Data

US 2014/0103144 A1    Apr. 17, 2014

Related U.S. Application Data

(60) Provisional application No. 61/713,975, filed on Oct. 15, 2012.

(51) Int. Cl.

| | |
|---|---|
| *F23D 11/46* | (2006.01) |
| *B05B 7/04* | (2006.01) |
| *F16J 15/34* | (2006.01) |
| *B05B 7/12* | (2006.01) |
| *B05B 7/24* | (2006.01) |

(52) U.S. Cl.
CPC ........... *B05B 7/0408* (2013.01); *B05B 7/1236* (2013.01); *B05B 7/2405* (2013.01); *F16J 15/34* (2013.01); *Y10T 29/49716* (2015.01)

(58) Field of Classification Search
CPC . B05B 7/0408; B05B 7/1236; B05B 7/2405; F16J 15/34; Y10T 29/49716
USPC ................. 239/414, 423, 424, 433, 290, 525
See application file for complete search history.

(56) References Cited

U.S. PATENT DOCUMENTS

| | | | | |
|---|---|---|---|---|
| 3,606,170 A | * | 9/1971 | Hoffman et al. ..... | B05B 7/1209 239/414 |
| 3,799,403 A | * | 3/1974 | Probst .................. | B29B 7/7438 239/414 |
| 3,900,163 A | * | 8/1975 | Volker ................. | B05B 7/1209 239/414 |

* cited by examiner

*Primary Examiner* — Steven J Ganey
(74) *Attorney, Agent, or Firm* — Marsh Fischmann & Breyfogle LLP

(57) ABSTRACT

Provided are various embodiments of polymeric seals that may be incorporated into two-component spray guns to replace a metal-to-metal seal surface within the gun to reduce scoring.

6 Claims, 9 Drawing Sheets

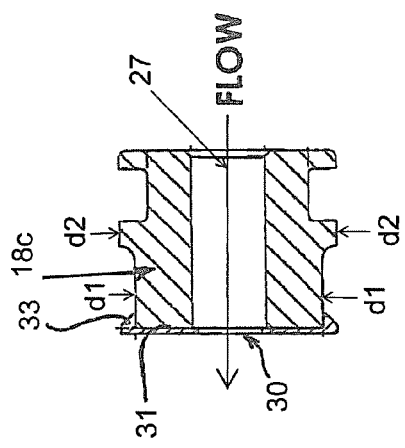
FIG. 9
SECTION C-C
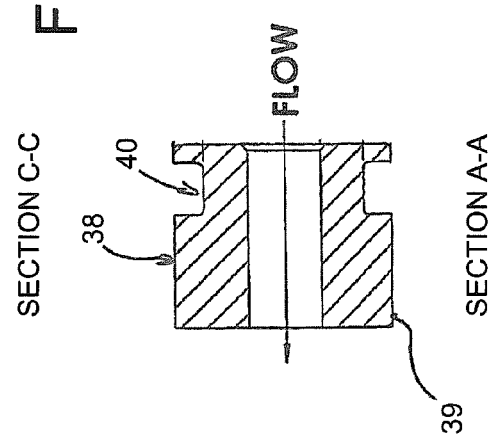
FIG. 10
SECTION A-A
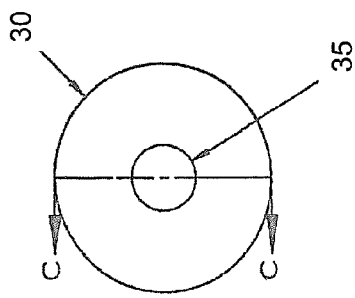
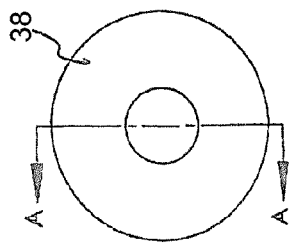

SEAL MEMBER FOR PLURAL COMPONENT SPRAY GUN

CROSS REFERENCE

This application claims the benefit of U.S. Provisional Application No. 61/713,975 having a filing date of Oct. 15, 2012, the entire contents of which is incorporated herein by reference.

FIELD

The present disclosure is directed to a plural component spray gun that admixes at least two components during application. More specifically, the present disclosure is directed to an improved seal assembly that reduces wear on the mixing chamber and improves reliability of the spray gun.

BACKGROUND

Plural component spray guns are used for the spray application of two-component materials such as gel-coats, polyesters and fast setting materials such as foam insulation. Generally, the two components react with one another requiring mixing of these components during application. In this regard, during operation of the spray gun, two or more components are supplied to the spray gun via separate supply sources (e.g., supply lines leading to separate component reservoirs). Often, one or all components are supplied under pressure and/or preheated. Once received by the spray gun, the components are combined in a mixing chamber and expelled under pressure (e.g., fluid pressure and/or air pressure) via a nozzle prior to the components beginning to set.

SUMMARY

The present inventor has recognized a number of shortcomings in relation to various prior art plural component spray guns. For instance, the inventor has recognized that various spray guns utilize a metal to metal contact between a mixing chamber and side seal assemblies, which supply separate component materials to the mixing chamber. During actuation of the spray gun, the mixing chamber typically moves between a first position and a second position relative to the side seals assemblies. Metallic contact surfaces (e.g., seal surfaces) of the seal assemblies slide over an outside surface of the mixing chamber during such movement resulting in the metal to metal contact. Stated otherwise, plural component air purge (AP) guns as originally designed, require a machined metal to metal contact seal to contain the components and prevent leaking. This works in theory, or until the mixing chamber under goes continuous use at which time wear and scoring becomes problematic.

Previous efforts to reduce wear between the mixing chamber and the metallic seal surfaces have included the injection of lubricants (e.g., lithium grease) into the spray gun. However, the present inventor has recognized that at least in the application of dual component spray foams, one of the components adversely reacts with the standard recommended lubricant (e.g., lithium grease). This reaction results is a caking/hardening of the grease. More specifically, during use, the spray gun heats due to the liquid component material(s) having been pre-heated in a proportioner (e.g., Graco® E-20), which causes the grease to melt. The melted grease in conjunction with movement of the mix chamber allows the grease to infiltrate between the metal to metal interface. That is, when the trigger of the gun is depressed, compressed air moves the mixing chamber to align inlet ports of the mix chamber with component supply apertures in the seal assemblies allowing component materials to flow into the mix chamber. When the trigger is released, the mixing chamber is forced forward closing the apertures in the seal assemblies and exposing the inlet ports of the mixing chamber to compressed purge air. The purge air forces out excess material in the mix chamber and forces in grease to coat the mixing chamber reducing the buildup of waste foam. In addition, an outside surface of the mix chamber is coated with a thin layer of melted grease.

Due to the reaction between the melted grease on the outside surface of the mix chamber and the component material, a thin layer of the hardened grease forms in the interface between the mix chamber and the seal surface of the seal assembly. This hardened grease in the interface subsequently crumbles and scores of the outside surface of the mixing chamber and/or the seal surface. For instance, in a two-component foam application, having an "R" component and an "A" component, the "A" component causes the grease to harden into a cake-like material. Accordingly, the cake-like material is ground between the seal surface of the seal member and the mixing chamber. This results in scoring and leakage.

To coned such scoring, the AP gun must be cleaned and the metallic seals and mixing chamber must be polished to maximize the machined surface contact to seal the liquid material components. Often this entails using wet-dry sandpaper on a steel bed to ensure a flat surface. The grease can react within 15 minutes causing severe scoring in less than 30 minutes. This results in a complete teardown of the wet end, clean, polish, reassemble, and start over applying foam insulation. The time lost in this process can be as much as 60-90 minutes.

To alleviate such scoring, the presented improvement utilizes a replacement seal assembly having either a cupped washer formed of a polymeric material that fits over the seal surface of the original metallic seal or a replacement polymeric seal member. In a first configuration, a polymeric washer fits over the seal surface of an existing metallic seal. In a second configuration, the polymeric seal includes a polymeric face or sealing surface that contacts the mixing chamber. In either configuration, the polymeric seal surface acts like a "squeegee" against the side of the mixing chamber, which removes the grease from the outside surface of the mixing chamber prior to contacting the adversely reacting material component. It also acts like a flat "ball bearing" eliminating the friction between the two metal surfaces.

In previous operation, standard practice has been to have extra mixing chambers on hand and either re-polish the mixing chamber or replace the mixing chamber once it becomes scored. In one particular dual component spray gun, the mixing chambers retail for $175.00 each, and each job is priced to include replacement with a fresh chamber. The metal side seals cost $36.00 each and a pair is required for the gun to operate. Often multiple chambers and side seals are required for a single job adding significant cost to a project. In contrast, the polymeric washers can be manufactured and retailed at approximately $20.00 per set and will generally last for the duration of a project and can be reused providing significant saving over previous applications. Similar savings are achieved using the replacement polymeric side seal.

According to one aspect, a multiple component spray gun is provided. The spray gun includes a gun body having first and second component inlets that are connectable to first and second sources of fluid component materials. The gun further includes first and second seal assemblies within ports of the gun body. These seal assemblies are in fluid communication with the first and second component inlets in order to provide the component materials to a mix chamber located within the gun body. Each of the first and second seal assemblies includes a polymeric seal surface that is adapted for compressive engagement against an outside surface of the mix chamber. Typically, the component materials flow through an aperture extending through the seal surfaces. The mix chamber includes first and second inlet apertures that extend through a sidewall of the mix chamber to an internal chamber. The mix chamber is operative to move between first and second positions such that the inlet apertures are aligned and nonaligned with the apertures within the seal surfaces.

In one arrangement, each of the seal assemblies includes a housing having a hollow interior and a substantially cylindrical seal member disposed therein. In one specific arrangement, the seal member is a metallic element and the polymeric seal surface is a polymeric washer that is disposed between the forward end of the metallic seal element and an outside surface of the mix chamber. In another arrangement, the seal member is a polymeric member having a forward face or sealing surface that is compressed against the mix chamber.

In another aspect, a method is provided for modifying a multiple component spray gun. The method includes removing one or more seal assemblies retained within the body of the spray gun. Typically, each seal assembly will include a housing, a biasing member and metallic seal member having a metallic sealing surface that contacts a mixing chamber of the spray gun. The biasing member compresses the sealing surface against the mixing chamber of the spray gun. A polymeric sealing surface is inserted into each of the seal assemblies such that the polymeric sealing surface is compressed between the biasing member and the mixing chamber.

In one arrangement, inserting the polymeric sealing surface includes inserting a polymeric washer over the metallic sealing surface of the metallic seal member. In another arrangement, inserting the polymeric sealing surface includes removing the existing metallic seal member and replacing this metallic seal member with a polymeric seal member.

In another aspect, a polymeric seal is provided for insertion in a multiple component spray gun having at least one seal assembly with a seal surface that is compressed against a mix chamber, which moves between first and second positions. The seal include substantially cylindrical body formed of a polymeric material where the cylindrical body is adapted for conformal received within a cylindrical housing of the seal assembly. A forward end of the cylindrical body forms a polymeric seal surface that is adapted for compression against a mix chamber of the multiple component spray gun. A forward portion of the cylindrical body has a continuous outside surface or diameter over at least 25% of the length of the cylindrical body between the forward end and a rearward end of the cylindrical body. In a further arrangement, the continuous outside diameter extends over at least 50% of the length of the cylindrical body. Finally, the cylindrical body includes an annular recess disposed between the rearward end of the continuous cylindrical outside surface and a rearward end of the cylindrical body. This annular recess is adapted to receive an o-ring. The seal may be provided in a kit including instructions detailing its insertion into a particular spray gun.

In another aspect, a seal washer is provided that is adapted for insertion between a metallic seal surface of a seal assembly of a multiple component spray gun and a moving mix chamber of the spray gun. The seal washer is a polymeric element having a forward sealing surface that is adapted for compression against the mix chamber. A rearward face of the seal washer is adapted to receive a forward face of an existing metallic seal element. In one arrangement, a peripheral rim of the rearward face is adapted for disposition between an outside diameter of the existing metallic seal element and inside diameter of the housing that supports the metallic seal element. Such a peripheral rim limits movement of the seal element. The seal washer may be provided in a kit including instructions detailing its insertion into a particular spray gun.

BRIEF DESCRIPTION OF THE FIGURES

FIG. 9 illustrates a seal washer adapted for disposition over a metallic seal member.

FIG. 10 illustrates a polymeric seal member.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

FIGS. 1-8 illustrate one embodiment of an air purge spray gun in which improved side seal assemblies may be utilized.

Figure 1:
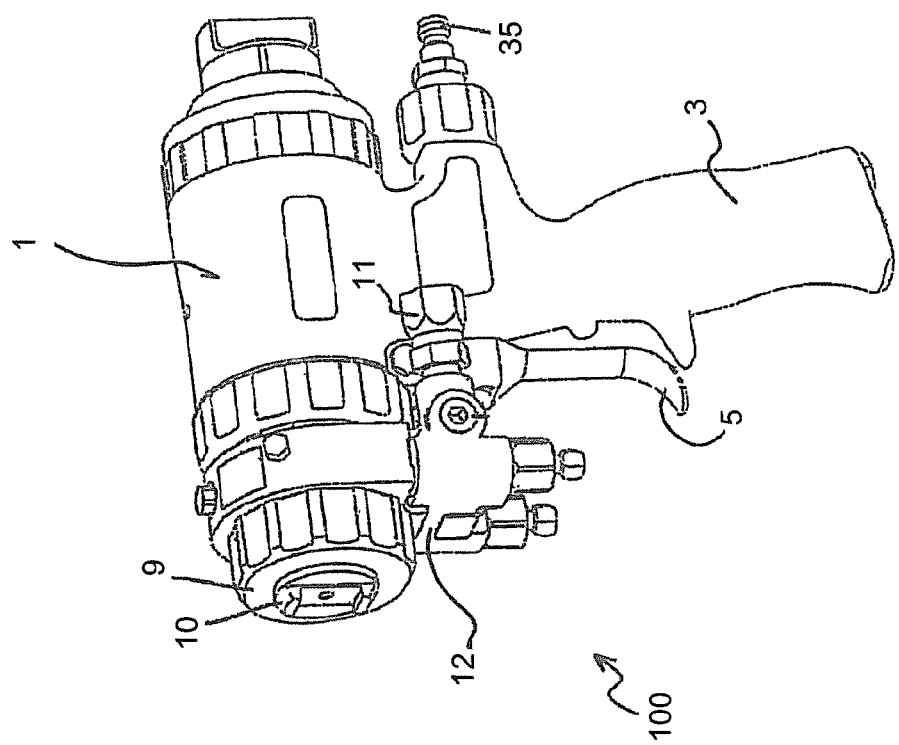
FIG. 1 illustrates one embodiment of a two component spray gun.
Figure 2:
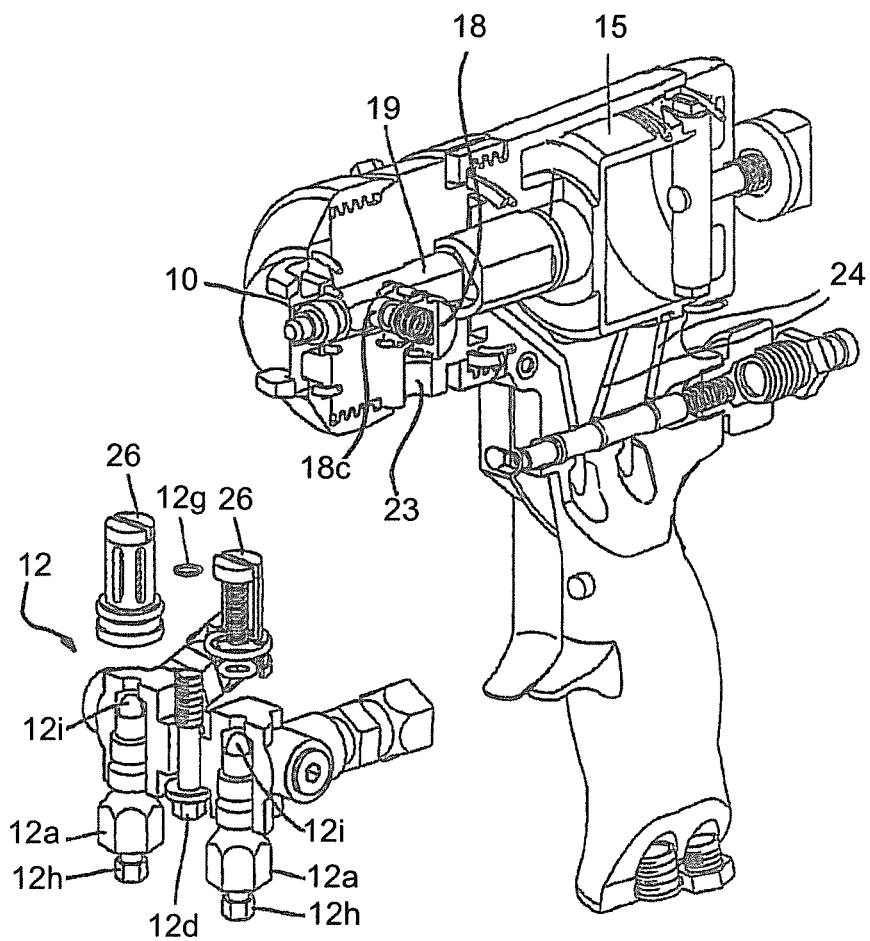
FIG. 2 illustrates a partial cross-sectional view of the spray gun of FIG. 1.
Figure 3:
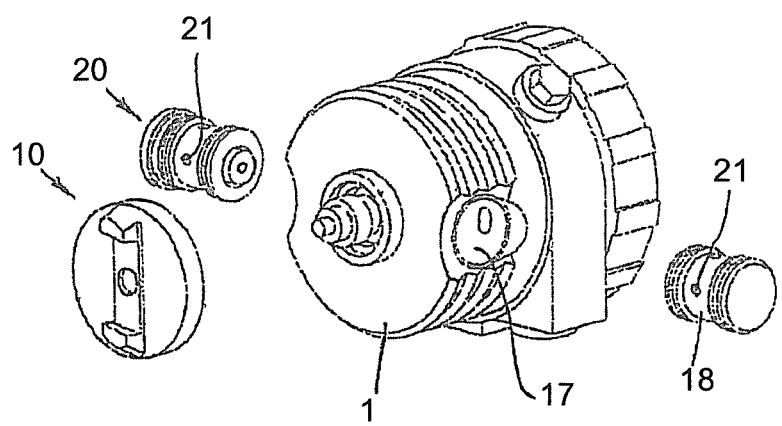
FIG. 3 illustrates an exploded view of a forward end of the spray gun of FIG. 1.

As shown in FIG. 1, the gun 100 is comprised of a gun body 1, handle 3, trigger 5 and aircap 10. The gun 100 is connectable to a compressed air source via an air inlet 35 and first and second component sources via a manifold 12. Each component source (not shown) is connectable to a separate inlets 11 (only one shown). The components are combined in an internal mix chamber 19. See FIGS. 5 and 6. In operation, a user grasps the handle 3 and depresses the trigger 5 to mix the components in the mixing chamber 19 within the gun body 1 and expel the mixed material through the aircap 10.

Depressing the trigger 5 allows connecting air from the compressed air source with a piston 15 via air passageways 24. See FIG. 2. The compressed air moves the piston 15 and mix chamber 19 from a forward position (see FIG. 8) to a retracted position (see FIG. 7) towards a rear end of the gun. Retracting the mix chamber 19 allows material to enter the mix chamber 19 via first and second side seal assemblies 18 and 20, which are in fluid communication with the material component inlets 11 via a manifold 12. See FIG. 2. In the illustrated embodiment, the fluid manifold assembly 12 includes first and second fluid inlet valves 12a that are each provided with a one piece stem 12h with a seal 12i threaded onto the other end for releasably shutting off fluid flow of the material being controlled. Fluid manifold 12 attaches to the body 1 via bolt 12d and sealing o-ring 12g.

Figure 4:
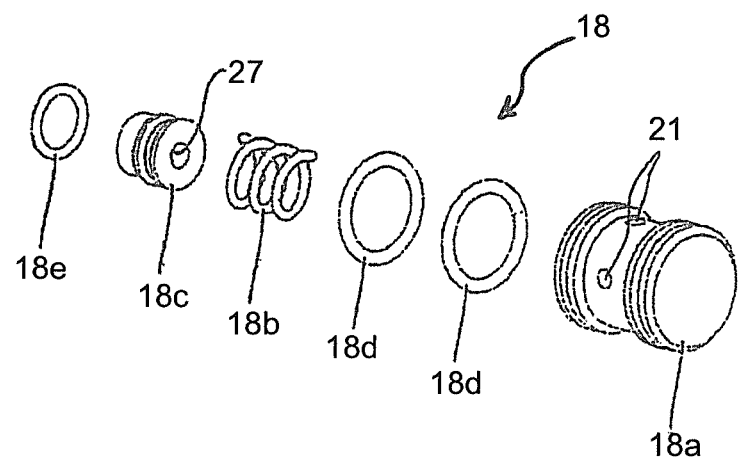
FIG. 4 illustrates an exploded view of a seal assembly of the spray gun of FIG. 1.
Figure 5:
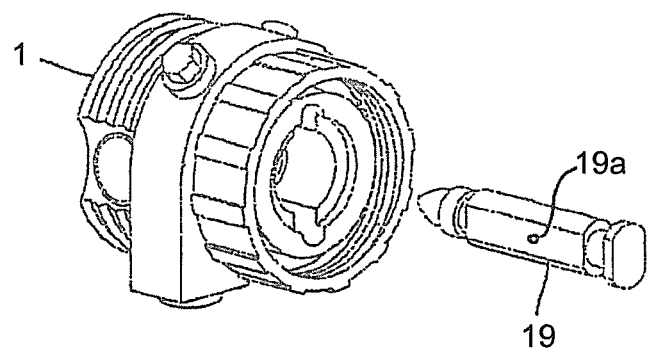
FIG. 5 illustrates a forward end of the spray gun and a mix chamber.
Figure 6:
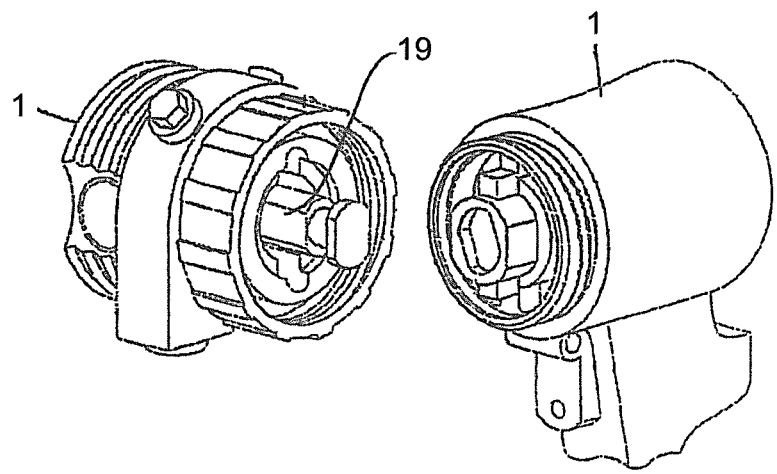
FIG. 6 illustrates a forward end and rearward end of the spray gun.

As shown in FIG. 4, side seal assemblies 18 and 20 (only side seal assembly 18 is illustrated for purposes of clarity; side seal assembly 20 is identical) each include a housing 18a, spring 18b, seal member 18c and o-rings 18d, 18e. The spring 18b is disposed between a closed end of the housing and the seal member 18c and works to force a forward surface of the seal member 18c against the mixing chamber 19 when the gun 100 is assembled. Upon assembly, each side seal assembly is received within a seal aperture 17 (see FIG. 3) in the body and held in place by a retaining ring 9 threaded on the front end of the body 1. See FIG. 1. The sealing surfaces of side seal assemblies 18 and 20 and the corresponding side surfaces of mix chamber 19 were previously made of a hardened metal material such as 440C stainless steel.

The housing 18a of each side seal cartridge assemblies 18 or 20 includes one or more apertures 21 that are in fluid communication with a port 23 in the body 1. See FIG. 2. This port is in fluid communication with the manifold 12 such that each side seal assembly is in communication with one of the component inlets 11 (FIG. 1). Disposed within the port are check valves 26 providing single direction flow. However, this is not a requirement. In operation, when the trigger is depressed, the piston retracts the mix chamber such that offset impingement holes or inlet apertures 19a (see FIG. 7) of the mixing chamber 19 are aligned with an internal apertures 27 of the seal member 18c, which receives its respective component via the apertures in the housing 18a.

The two impingement holes or inlet apertures 19a, 19b are typically located on opposing sides of the mix chamber and are angularly offset (not shown) to cause a toriodal effect that mixes the materials as they enter the internal chamber 19c. When aligned with the apertures in the seal members 18c, components enter the impingement holes and mix in the internal chamber 19c. The pressure of the components mixes these fluids within the internal chamber and expels the mixed material through the outlet end of the mixing chamber.

Figure 7:
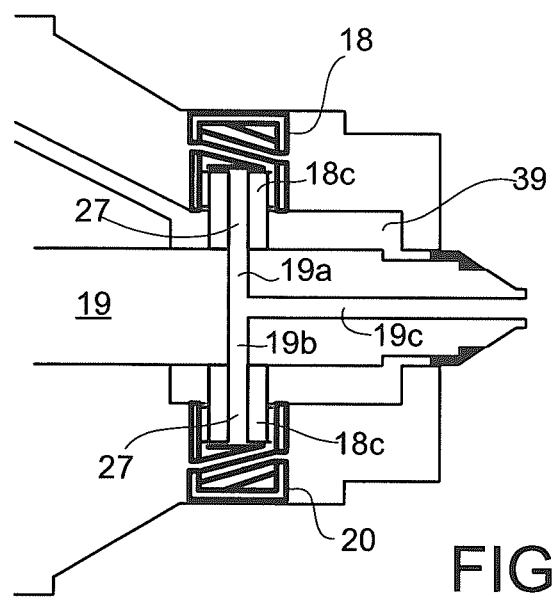
FIG. 7 illustrates a cross-sectional view of the forward end of the spray gun showing the mixing chamber in a retracted position.
Figure 8:
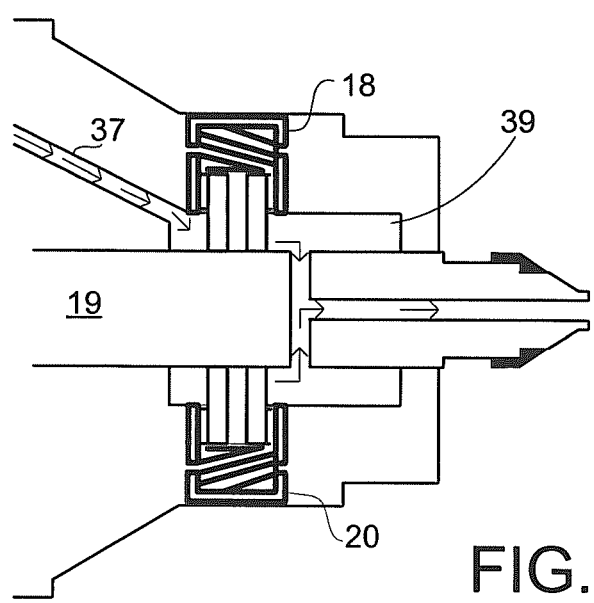
FIG. 8 illustrates a cross-sectional view of the forward end of the spray gun showing the mixing chamber in an extended position.

Referring to FIGS. 7 and 8, operation of the gun 100 is more fully discussed. When the trigger of the gun is depressed, the mixing chamber 19 is retracted (See FIG. 7) and the two components pass through the central apertures 27 in the seal members 18c of each of the side seal assemblies 18, 20. These components pass into the mixing chamber 19 as described above. When the trigger is released, the mixing chamber moves forward and the ends of the side seals 18c slide on an outside surface of the mixing chamber 19. See FIG. 8. When the mixing chamber 19 moves forward, the impingement holes are exposed to an air chamber 39. Purge air from a purge air port 37 enters into the impingement holes 19a and 19b of the mixing chamber via the air chamber and forces remaining components/mixed material out of the mixing chamber 19. In addition to supplying purge air, the purge air port 37 and chamber 39 are also in communication with a grease zerk (not shown). In this regard, grease such as lithium grease is introduced into the chamber 39 around the outside of the mixing chamber 19. The grease helps facilitate sliding of the seal surfaces of the seal members 18c over the outside of the mixing chamber 19. However, the inventor has also recognized that, in some two component mixtures, the grease reacts with one or both of the components.

The reaction with one of the components results in a caking of the grease. Once the grease cakes, the caked/hardened grease causes scoring between the metal to metal interface between the seal members 18c and the outside surface of the mixing chamber 19. Such scoring results in leakage and requires gun disassembly and polishing of the outside surface of the mixing chamber, side seals and/or replacement of these parts. Further, the inventor has recognized that previous seal members have had a diameter that is less than the diameter of the housing 18a (see FIG. 4) in which they are inserted to allow sufficient room for o-ring seals. This reduced diameter allows the side seal to slightly wobble, which also increases the ability of grease to infiltrate beneath the seal member and the outside surface of the mixing chamber where it cakes. This further increases scoring.

To alleviate the scoring problem associated with the plural component gun, the inventor has recognized that the metal to metal contact between the side seals and the mixing chamber and grease caking can be alleviated by the insertion of a polymeric washer between the metallic seal member and mixing chamber or replacement of the metallic seal member with a polymeric seal member. As illustrated in FIG. 9, a polymeric washer 30 is provided that interfaces with the front surface 31 of an existing metallic seal member 18c. This washer is cup-shaped includes an elevated rim 33 about its back surface having an internal diameter that is sized to fit over the outside diameter of the forward end 31 (seal surface) of the existing seal member 18c. As shown, the diameter $d_1$ of the end surface 31 of the existing seal member 18c is less than the inside diameter of the housing, which is the same as the outside diameter $d_2$ of the o-ring retention recess in the seal member 18c. As noted above, this reduced forward diameter $d_1$ previously allowed the seal member 18c to wobble allowing grease infiltration between the seal member 18c and mix chamber. The rim 33, stabilizes the seal member and thus reduces grease infiltration.

To allow passage of component through the washer 30, it has an aperture 35 that is aligned with the internal aperture 27 of the seal member 18c. The washer acts as a low friction coating for the seal member 18c and further acts to remove grease from the outside surface of the mixing chamber 19 as it moves back and forth. That is, the polymeric washer acts like a "squeegee" against the side of the mixing chamber. It also acts like a flat "ball bearing" eliminating the friction between the two metal surfaces.

The result is that less grease is able to enter the interface between the front surface of the washer 30 and the mixing chamber reducing grease caking. Further, if grease does infiltrate the interface, any scoring occurs on the softer polymeric washer rather than the harder metallic mixing chamber. Thus, if maintenance is required, the surface of the mixing chamber does not require polishing. Likewise, as preferential scoring of the washer prevents damage to the expensive mixing chamber; replacement is avoided. Finally, if scoring exists on the surface of the washer, it can be easily and quickly buffed out and/or the inexpensive washer may be replaced.

Figure 11:
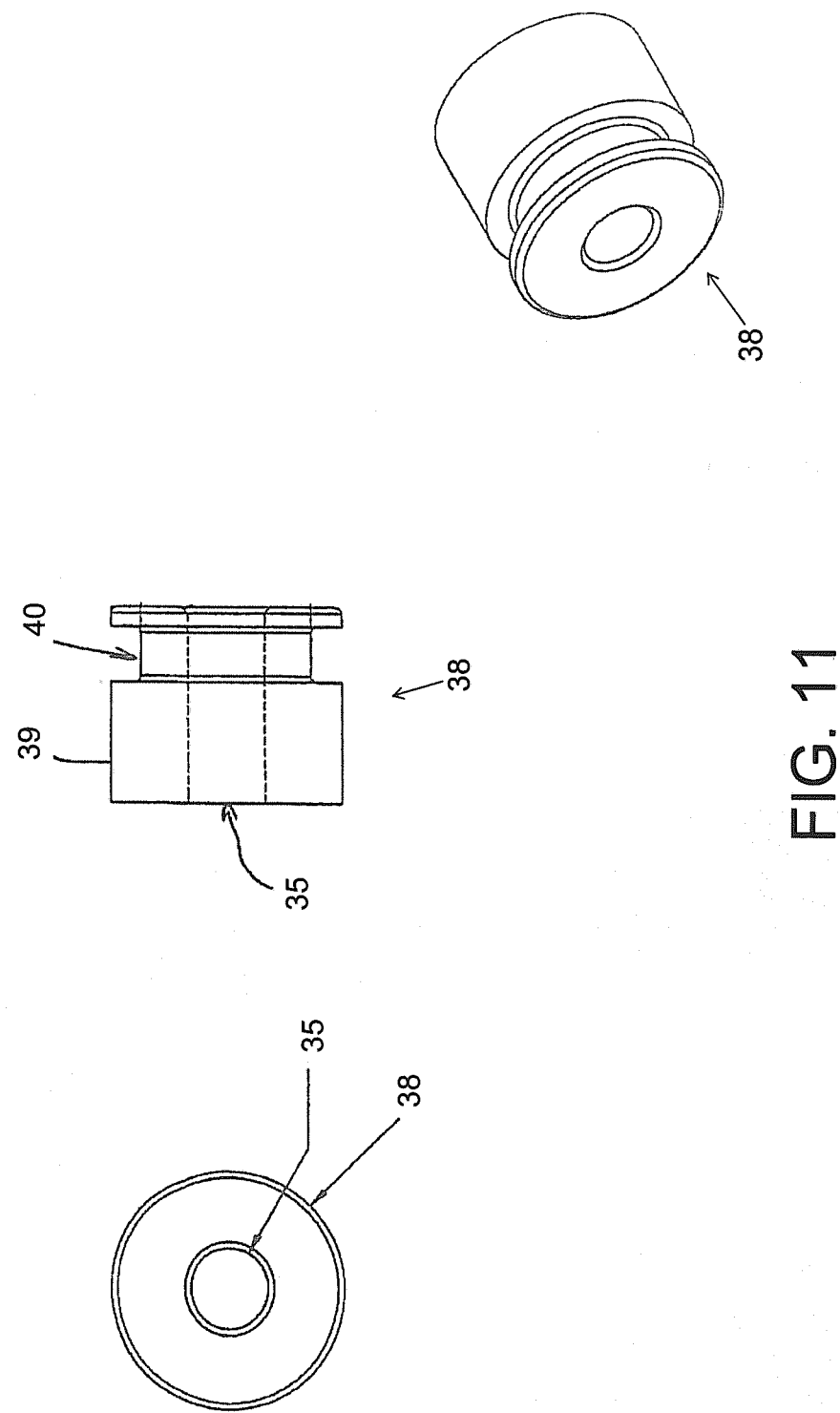
FIG. 11 illustrates a polymeric seal member.
Figure 12:
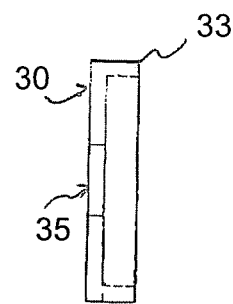
FIG. 12 illustrates a cup-shaped seal washer.
Figure 12:
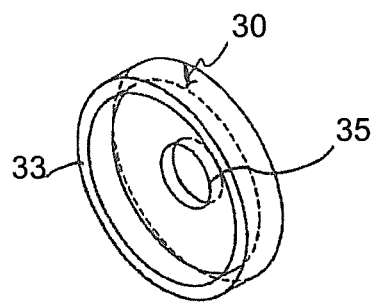
Figure 13:
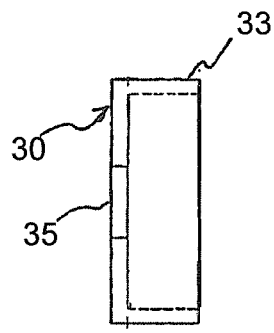
FIG. 13 illustrates a cup-shaped seal washer.
Figure 13:
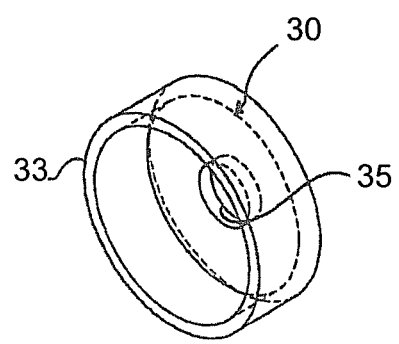

FIGS. 10 and 11 illustrate a replacement polymeric seal member 38. In this embodiment, rather than placing a washer on the forward surface of the existing metallic seal member, the gun is disassembled and the original seal member 18c is replaced with the replacement seal member 38, which is formed of a polymeric material. The seal member 38 again includes a central aperture 35 to allow component material to flow though the seal member. Further, an outside diameter of the polymeric seal member is sized to match an inside diameter of the housing 18a (see FIG. 4) to reduce or eliminate wobble. Further, the forward outside diameter is constant over at least 25% and more preferably more that 50% of the length of the seal member 38. This further increases the stability of the replacement seal member. A reward portion of the seal member further includes a recess 40 that allows the replacement seal member to support an o-ring. The function of the replacement side seal is otherwise substantially the same as the washer described above. Variations to the side seal are shown in FIGS. 12 through 13, which variously illustrate a cup-shaped washer/seal member 30.

Figure 14A:
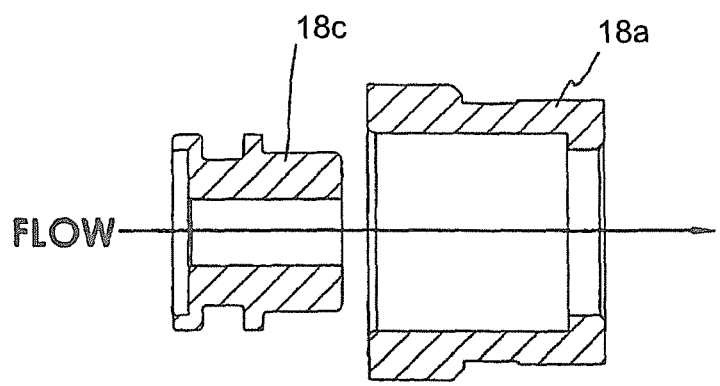
FIG. 14A illustrates an original seal assembly for a spray gun.
Figure 14B:
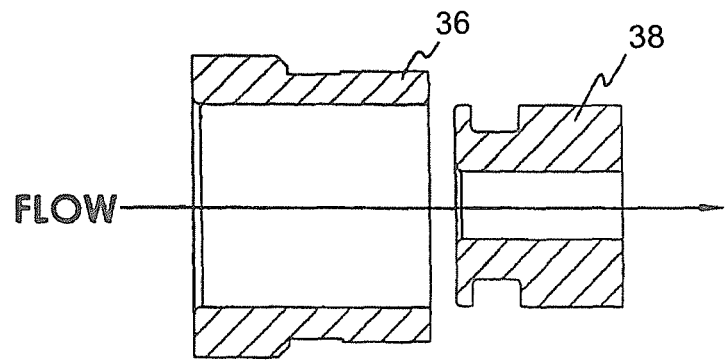
FIG. 14B illustrates a replacement seal assembly for a spray gun.

Though discussed above in relation to one specific air purge spray gun, it will be appreciated that the polymeric seal washers and/or replacement seal members may be incorporated into various different spray guns. In this regard, it is noted that the current industry standard for multiple component spray guns utilizes the metal seal member compressed against the metal mixing chamber. Such manufacturers include, without limitation, Graco®, Polymac USA and GlasCraft. Polymeric seals may be provided for these and other manufacturers. However, it will be appreciated that the design of individual guns varies. Accordingly, it may be necessary to provide an adaptor for use in different spray guns. As illustrated in FIG. 14A, an original seal assembly may include a seal housing 18a and a seal 18c specifically adapted for receipt within the housing 18a. In order to retrofit a replacement seal member 38 into a specific spray gun, it may be necessary to provide both a replacement housing 36 and a replacement seal member 38. See. FIG. 14B. In such an arrangement, it will be appreciated that the outside surface or other connection points of the replacement housing 36 may be configured identically with the original seal housing 18a.

Through experimentation, the inventor has determined that materials suitable for the polymeric washer or replacement seal member may depend on the pressure experienced by the spray gun. For a number of applications, Molecular Ultra High Density Polyethylene (MUHDP) may be utilized. However, for higher pressure and/or temperature applications, it may be desirable to utilize higher grade polymers. For instance, and without limitation, Polyoxymethylene (POM) (aka Delrin®), amorphous thermoplastic polyetherimide (PEI) resins (aka Ultem®), polyphenylsulfone (PPSU) (aka Radel®), and Polyether ether ketone (PEEK) polymers may be utilized.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A spray gun for multiple component materials, said spray gun comprising:
   a gun body having first and second component inlets connectable to first and second sources of fluid component material;
   first and second seal assemblies retained in first and second ports of said gun body, respectively, wherein said first and second seal assemblies each include:
   a housing having a hollow cylindrical interior;
   a cylindrical polymeric seal member disposed in said hollow cylindrical interior of said housing, wherein a forward end of said polymeric seal member forms a seal surface and wherein an outside diameter of said polymeric seal member substantially matches an inside diameter of said hollow cylindrical interior of said housing; and
   wherein said seal surface includes a seal surface aperture in fluid communication with one of said first and second component inlets;
   a mix chamber located within said body and having an internal chamber with first and second inlet apertures, wherein said polymeric seal surface of each of said first and second seal assemblies are compressed against first and second outside surfaces of said mix chamber, respectively, wherein said mix chamber is movable between a first position where said first and second inlet apertures are aligned with said seal surface apertures of said first and second seal assemblies, respectively, and a second position where said first and second inlet apertures are non-aligned with said seal surface apertures of said first and second seal assemblies, respectively.

2. The apparatus of claim 1, wherein said outside diameter substantially matching said inside diameter of is continuous over at least 25% of a height of said cylindrical polymeric seal member.

3. The apparatus of claim 2, wherein said outside diameter substantially matching said inside diameter is continuous over at least 50% of a height of said cylindrical polymeric seal member.

4. A spray gun for multiple component materials, said spray gun comprising:
   a gun body having first and second component inlets connectable to first and second sources of fluid component material;
   first and second seal assemblies retained in first and second ports of said gun body, respectively, wherein said first and second seal assemblies each include:

a housing having a hollow cylindrical interior;

a metallic seal member disposed in said hollow cylindrical interior of said housing, wherein an outside diameter of said metallic seal member is less than an inside diameter of said cylindrical interior;

a polymeric washer disposed on a forward end of said metallic seal member, wherein a forward end of said polymeric washer forms a seal surface that includes a seal surface aperture in fluid communication with one of said first and second component inlets and wherein an outside diameter of said polymeric washer substantially matches an inside diameter of said hollow cylindrical interior of said housing;

a mix chamber located within said body and having an internal chamber with first and second inlet apertures, wherein said seal surface of each of said first and second seal assemblies are compressed against first and second outside surfaces of said mix chamber, respectively, wherein said mix chamber is movable between a first position where said first and second inlet apertures are aligned with said seal surface apertures of said first and second seal assemblies, respectively, and a second position where said first and second inlet apertures are non-aligned with said seal surface apertures of said first and second seal assemblies, respectively.

5. The apparatus of claim 4, wherein said polymeric washer further comprises:

a rim extending about a periphery of said polymeric washer, wherein said rim is disposed between said outside diameter of said metallic seal member and an inside diameter of said hollow cylindrical interior of said housing upon assembly.

6. The apparatus of claim 5, wherein said polymeric washer is cup-shaped.

* * * * *